(12) United States Patent
Luo et al.

(10) Patent No.: US 10,551,226 B2
(45) Date of Patent: Feb. 4, 2020

(54) SYSTEM AND METHOD FOR SCALABLE CLOUD-BASED SENSOR CALIBRATION

(71) Applicants: Yong Luo, St. Petersburg, FL (US); Gustavo Armando Suarez, St. Petersburg, FL (US)

(72) Inventors: Yong Luo, St. Petersburg, FL (US); Gustavo Armando Suarez, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 541 days.

(21) Appl. No.: 14/946,121

(22) Filed: Nov. 19, 2015

(65) Prior Publication Data

US 2017/0146375 A1    May 25, 2017

(51) Int. Cl.
  *G01D 18/00*    (2006.01)
  *H04L 29/08*    (2006.01)

(52) U.S. Cl.
  CPC ............. *G01D 18/00* (2013.01); *H04L 67/10* (2013.01); *H04L 67/12* (2013.01)

(58) Field of Classification Search
  CPC .......... H04L 67/12; H04L 67/10; G01D 18/00
  USPC .................................................... 702/85, 104
  See application file for complete search history.

(56) References Cited

U.S. PATENT DOCUMENTS

| | | | | |
|---|---|---|---|---|
| 7,269,527 B1* | 9/2007 | Frank | ......................... | G01T 7/00 340/286.01 |
| 8,447,249 B1* | 5/2013 | Lu | ......................... | H03G 3/3042 375/297 |
| 2005/0256660 A1* | 11/2005 | Laraia | ..................... | G01D 3/022 702/107 |
| 2006/0108465 A1* | 5/2006 | Barscevicius | ............. | B02C 7/14 241/261.2 |
| 2006/0213249 A1* | 9/2006 | Uram | ..................... | G01F 25/003 73/1.36 |
| 2006/0258929 A1* | 11/2006 | Goode, Jr. | ........... | A61B 5/0031 600/345 |
| 2008/0309968 A1 | 12/2008 | Berestov et al. | | |
| 2009/0204370 A1 | 8/2009 | Chu et al. | | |
| 2012/0173185 A1* | 7/2012 | Taylor | ................... | G01B 11/026 702/104 |
| 2013/0046501 A1* | 2/2013 | Nentwich | .............. | G05B 21/02 702/104 |
| 2013/0124127 A1* | 5/2013 | Ahuja | ..................... | G01C 25/00 702/86 |
| 2013/0179108 A1* | 7/2013 | Joseph | .................... | G01D 18/00 702/104 |

(Continued)

OTHER PUBLICATIONS

International Preliminary Report on Patentability, dated May 31, 2018 for PCT/US2016/063108.

*Primary Examiner* — John E Breene
*Assistant Examiner* — Jeffrey P Aiello
(74) *Attorney, Agent, or Firm* — Thomas J. McWilliams; Barnes & Thornburg LLP

(57) ABSTRACT

A scalable sensor calibration system and method configured to calibrate and/or recalibrate sensors based on calibration parameters received from secure cloud storage. A plurality of calibration parameter sets for a plurality of sensors may be received from the secure cloud storage and successively transmitted to each of the plurality of sensors using a calibration system bus interface. Calibration output data generated by the sensors using the calibration parameters is received and used to create new, optimized calibration parameters sets.

12 Claims, 9 Drawing Sheets

(56) References Cited

U.S. PATENT DOCUMENTS

| | | | |
|---|---|---|---|
| 2013/0317775 A1* | 11/2013 | Uratani | G01M 17/007 |
| | | | 702/113 |
| 2014/0278186 A1 | 9/2014 | Herzl et al. | |
| 2014/0343885 A1* | 11/2014 | Abrahamsson | G01C 22/006 |
| | | | 702/96 |
| 2016/0187368 A1* | 6/2016 | Modi | G08B 13/08 |
| | | | 702/141 |
| 2016/0356820 A1* | 12/2016 | Ausserlechner | G01R 15/202 |
| 2017/0049964 A1* | 2/2017 | Varsavsky | A61M 5/1723 |

* cited by examiner

SYSTEM AND METHOD FOR SCALABLE CLOUD-BASED SENSOR CALIBRATION

FIELD OF THE DISCLOSURE

The present disclosure relates to configuring sensors, and, more specifically, to the calibration and/or re-calibration of sensors utilizing one or more calibration parameter settings obtained from a computing network.

BACKGROUND

Sensor devices, and/or more particularly "smart" sensor systems, typically combine a sensing element, analog interface circuit, an analog-to-digital converter (ADC), and a bus interface, all-in-one housing, and may include additional functionality, such as self-testing, self-identification, self-validation, or self-adaptation, by way of example. The single-housing sensor system may also be configured to perform signal processing and multi-sensing capabilities. Typical configurations of these sensors may include an analog front end (AFE), analog-to-digital converter (ADC), and digital signal processing (DSP) circuit and control.

The AFE module typically includes a front-end signal conditioning circuit, a programmable gain amplifier (PGA) and an analog filter. A post-processing DSP circuit may include different types of digital filters. Due to silicon deep sub-micron manufacturing process limitations for devices (e.g., sensors), and the precision requirements of the circuit design specifications for different industry standards, the analog and digital circuits implemented into these sensor devices or smart sensor system modules often include dedicated calibration circuits and common system interfaces for calibration purposes.

Conventional sensor calibration at a circuit level may typically require a dedicated memory component, such as a non-volatile EEPROM, to store predefined calibration coefficients, and/or other calibration parameters. These calibration parameters may also include AFE programmable gain coefficients, as well as calibration configuration and calibration output data. Some analog filters may also be calibrated with predefined coefficient settings through the system calibration interface. Similarly, DSP circuits may include different digital filters such as a finite impulse response (FIR) or Infinite Impulse Response (IIR) circuits, which can also be implemented with the system calibration interface. Using this configuration, calibration coefficient settings can thus be loaded into the dedicated memory storage.

Calibration of specific-use sensors may be costly and inefficient, as it may typically require individual calibration of each sensor geared to the specific use. A generic sensor calibration platform may be advantageous for accommodating various types of calibration parameters, particularly in cases where large quantities of sensor devices are produced in a manufacturing process. However, calibration platforms may involve the calibration of multiple different types of sensors, wherein each type of sensor may require multiple different predefined calibration coefficient settings, calibration configurations, and calibration output. Such manufacturing process configurations may require very large amounts of dedicated sensor calibration parameter settings and storage areas. Furthermore, incremental accumulation and periodic updates of the sensor calibration parameter settings back to the calibration system would be costly to implement using strictly conventional manufacturing calibration systems. As such, apparatuses, systems and methods are needed to improve the effectiveness and efficiency of programming and updating calibration parameters for sensors in a scalable environment.

SUMMARY

In illustrative embodiments, computer systems are disclosed for calibrating one or more sensors, comprising: a processor; a communication interface, operatively coupled to the processor, the communication interface configured to receive a calibration parameter set from a computer network; a calibration system bus interface, operatively coupled to the processor, the calibration system bus interface being configured to transmit the received calibration parameter set to the one or more sensors, wherein the calibration bus interface is further configured to receive calibration output data from the sensors in response to the calibration parameter set, and wherein the communications interface is configured to transmit the calibration output data to the computer network for generating a new calibration parameter set.

In the illustrative embodiments, methods are disclosed for calibrating one or more sensors in a system, comprising: receiving a calibration parameter set for the one or more sensors from a computer network; transmitting the received calibration parameter set to the one or more sensors using a calibration system bus interface; receiving calibration output data from the sensors in response to the calibration parameter set; transmitting the calibration output data to the computer network; and receiving a new calibration parameter set for the one or more sensors in response to the calibration output data.

In further illustrative embodiments, methods are disclosed for calibrating one or more sensors in a system, comprising: receiving a plurality of calibration parameter sets for a plurality sensors from a computer network; successively transmitting each of the received calibration parameter sets to each of the plurality of sensors using a calibration system bus interface; successively receiving and storing calibration output data from each of the plurality of sensors in response to each calibration parameter set transmitted; transmitting the calibration output data to the computer network; and receiving a new calibration parameter set for the one or more sensors in response to the calibration output data.

BRIEF DESCRIPTION OF THE FIGURES

The present disclosure will become more fully understood from the detailed description given herein below and the accompanying drawings, which are given by way of illustration only and which thus do not limit the present disclosure, and wherein.

DETAILED DESCRIPTION

Figure 1A:
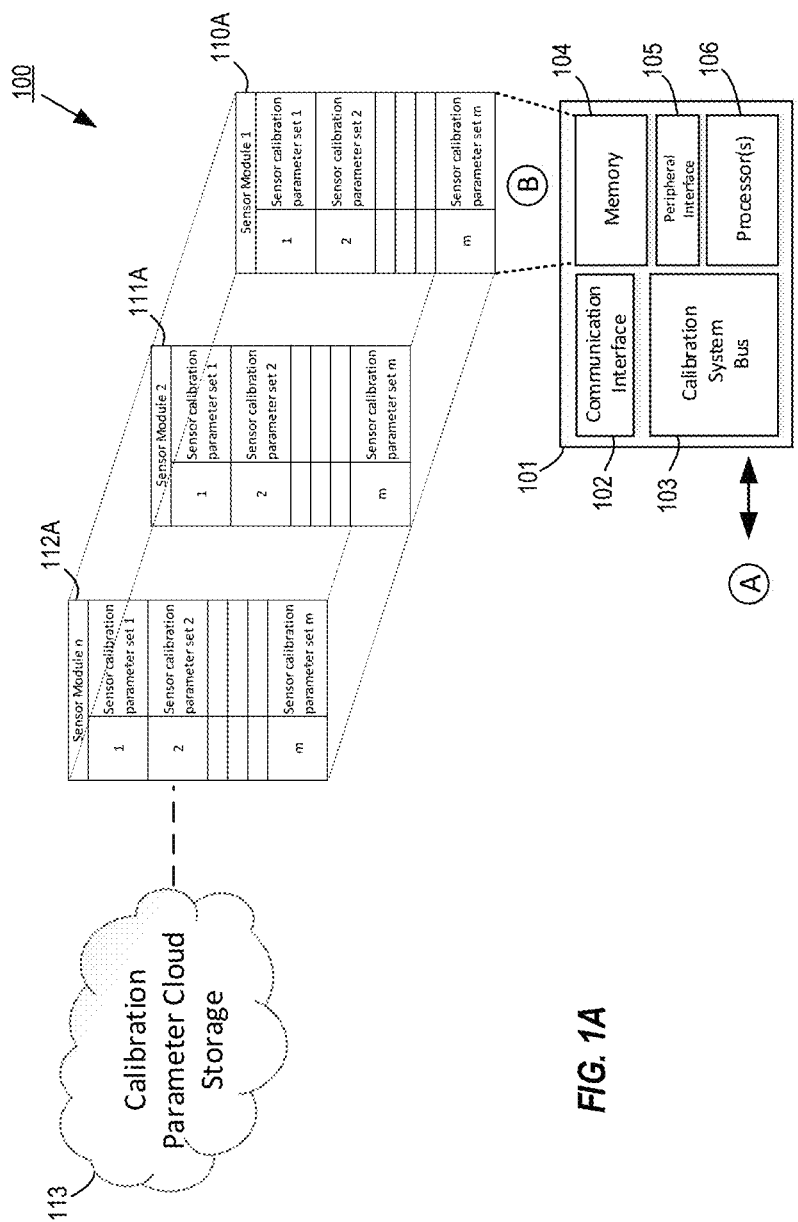
FIG. 1A shows a computing device for facilitating sensor calibration setup/update in a sensor system, where the computing device includes a communication interface and a calibration system bus for communicating with sensors and/or a computer network in an illustrative embodiment.

The figures and descriptions provided herein may have been simplified to illustrate aspects that are relevant for a clear understanding of the herein described devices, systems, and methods, while eliminating, for the purposes of brevity and clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art in light of the discussion herein.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is provided for the purpose of describing particular exemplary embodiments only and is not intended to be limiting. Accordingly, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a required order of performance. It is also to be understood that additional or alternative steps may be employed.

Moreover, if an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements may be interpreted in a like fashion (e.g., "between" versus "directly between," "adjacent" versus "directly adjacent," etc.). Further, as used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited or subjected to a particular order by these terms. These terms may be used only to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Various apparatuses, systems and methods may be provided for a cloud-based calibration storage and distribution platform. Such apparatuses, systems and methods can be used to store, download, upload and share multiple device calibration data, at the time of manufacturing, and/or for use after a calibrated device is out in the field, for example. A sensor device or smart sensor module, for example, may be configured to receive, transmit and/or update calibration parameter data stored in a secure cloud environment, and the device and/or its data may be made available for cloud-based analytics processing. Embodiments of the invention may be adapted to cover a wide range of sensor device types or smart sensor system modules, for example.

By arranging sensors in a sensor system to be scalable, each sensor device or smart sensor module subjected to calibration setup and/or update may have multiple pre-defined calibration parameter settings recalled and/or downloaded from a computer network and applied to individual sensor devices or smart sensor modules. The calibration parameters may further be managed by a system calibration operations programming sequence, such as from a calibration system computer.

Once calibration parameters are downloaded and tested, final device unique calibration data can be uploaded and stored in the computer network (e.g., cloud) for any number of applications including, but not limited to, future referencing in analytics processing of data across multiple manufacturing sites, comparing updated calibration data to original sensor manufacturer data, and/or for optimization in the field once the device becomes commercially available. Illustrative sensor calibration parameter settings may include, but are not limited to, in-circuit sensor calibration coefficient settings, calibration configuration settings, calibration output, and other calibration related parameters. Identical or similar stored sensor implementation circuit calibration parameters may also be shared in real-time through computer network storage across multiple manufacturing sites, and for post-manufacturing data and analytics processing.

A sensor system 100 is shown in FIGS. 1A-1D of an illustrative embodiment. Sensor system 100 may be configured as a generic calibration parameter system, including secure cloud storage for storing calibration parameters (see FIG. 1C), for example. With reference specifically to FIG. 1A, a system computer or computing device 101 is shown in an illustrative embodiment, wherein computing device 101 includes a communication interface 102, a calibration system bus 103, a memory 104, a peripheral interface 105 and one or more processors 106, including, but not limited to, a central processing unit (CPU), co-processor(s), graphics processing unit (GPU), digital signal processor (DSP) and microcontrollers. Communication interface 102 may include any suitable interface (e.g., TCP/IP) allowing communication to/from computer 101 to a computer network ("B") and to sensors ("A") via Calibration System Bus 103.

System bus 103 may be configured to pass communication and data to/from sensors ("A") and may be based on any suitable platform, including, but not limited to, Inter-IC bus ($I^2C$), serial peripheral interface (SPI), the IEEE 1461 standard (e.g., IEEE1451.2, and IEEE1451.3), and the Universal Micro-Sensor Interface (UMSI), that may include an Intra-Module Multi-element ($IM^2$) interface. In some illustrative embodiments, sensor system 100 may be configured to have platform-specific communications to accommodate platform-specific sensors (e.g., $I^2C$). In some illustrative embodiments, sensor system 100 may be configured to accommodate multiple platform-specific sensors in a plug-and-play environment (e.g., UMSI).

Figure 1B:
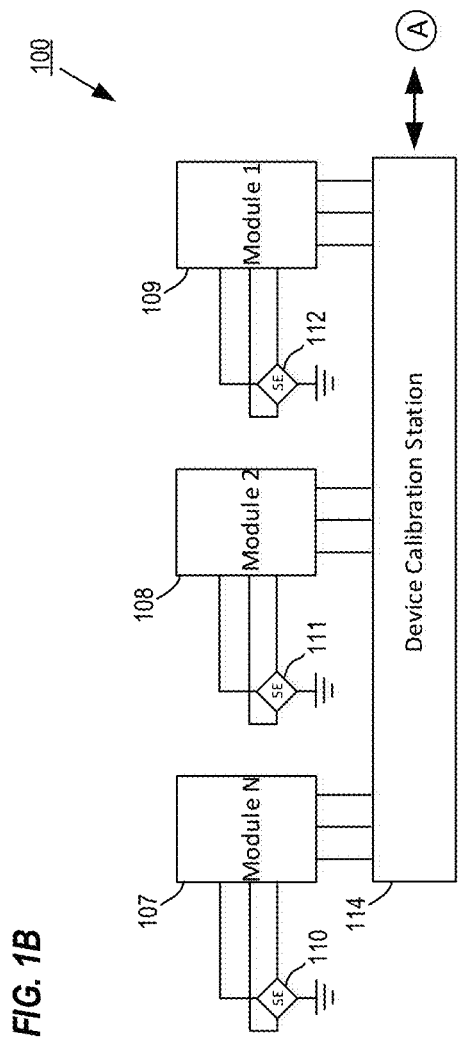
FIG. 1B shows a simplified sensor arrangement having a plurality of sensors that are coupled to the computing device of the sensor system of FIG. 1A under an illustrative embodiment.

With reference now also to FIG. 1B, a simplified sensor arrangement is shown having a plurality of sensors that are coupled to the computing device 101 of FIG. 1A according to an illustrative embodiment. In this example, the sensor arrangement may be configured as one or more sensor devices and/or smart sensor modules arranged for calibration in a manufacturing setup. Each of the sensor devices and/or smart sensor modules may include sensor elements (SE) 110-112 and calibration modules 107-109 arranged as two portions. Those skilled in the art should readily recognize that in certain illustrative embodiments, each SE (110-112) and respective calibration module (107-108) may be integrated together as a single unit. It will be understood that the term "module" as used herein does not limit the functionality to particular physical modules, but may include, any number of software and/or hardware components.

In general, a computer program product in accordance with certain embodiments may include a tangible, computer usable medium (e.g., RAM, ROM, an optical disc, a USB drive, or the like) having computer-readable program code embodied therein, wherein the computer-readable program code is adapted to be executed by a processor (working in connection with an operating system and/or executable software) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

The sensor circuit arrangement of FIG. 1B may further include front end sensing element(s), (e.g., resistors formed in a Wheatstone bridge configuration for a pressure sensor), followed by an analog front end (AFE) signal conditioning circuit, which may include programmable gain amplifier(s) and analog filters, followed by the analog-to-digital converter (ADC). Such an arrangement may further include digital signal processing (DSP) circuitry for post-processing operations, for example. In certain illustrative embodiments, each sensor element (e.g., 110) may communicate with a respective calibration module (e.g., 107) to send/receive data including, but not limited to, calibration parameter data, Each calibration module (e.g., 107-109) may be connected to a common bus (as shown in FIG. 1B) through a device calibration station (114) to couple to computing device 101 ("A") for receiving such data. In illustrative embodiments, the calibration modules may connect to a plurality of buses for communicating with computing device 101. In such a configuration, computing device 101 may include a plurality of system buses (103) for facilitating such communication.

Figure 1C:
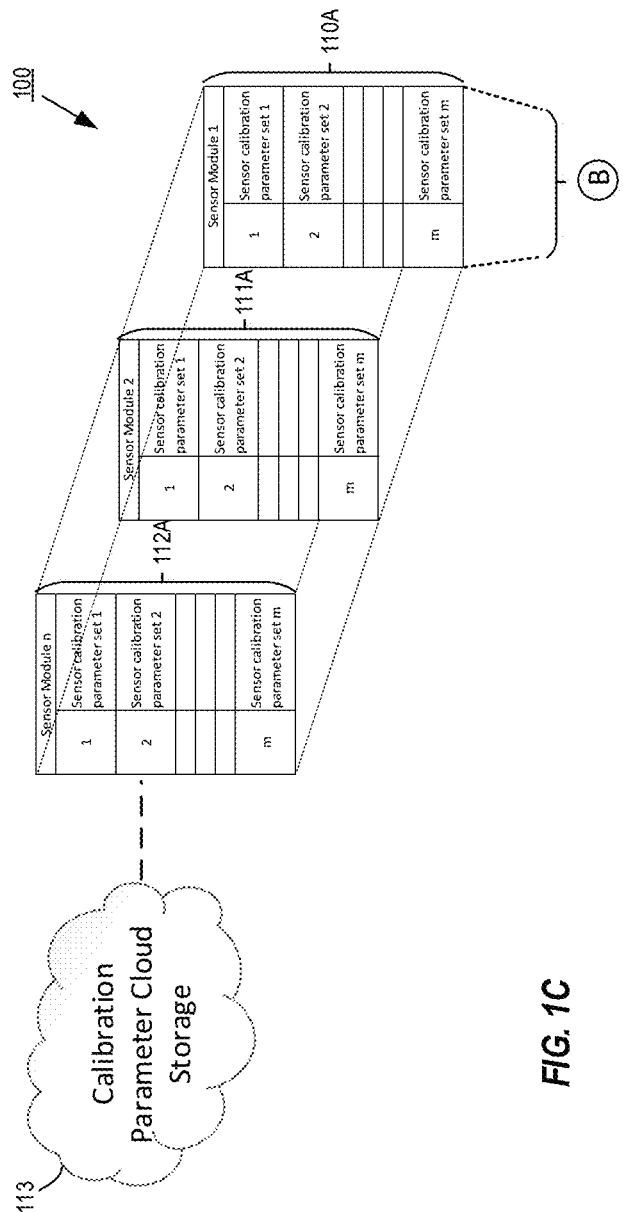
FIG. 1C shows a sensor calibration parameter database configured in a computer network under an illustrative embodiment.
Figure 1D:
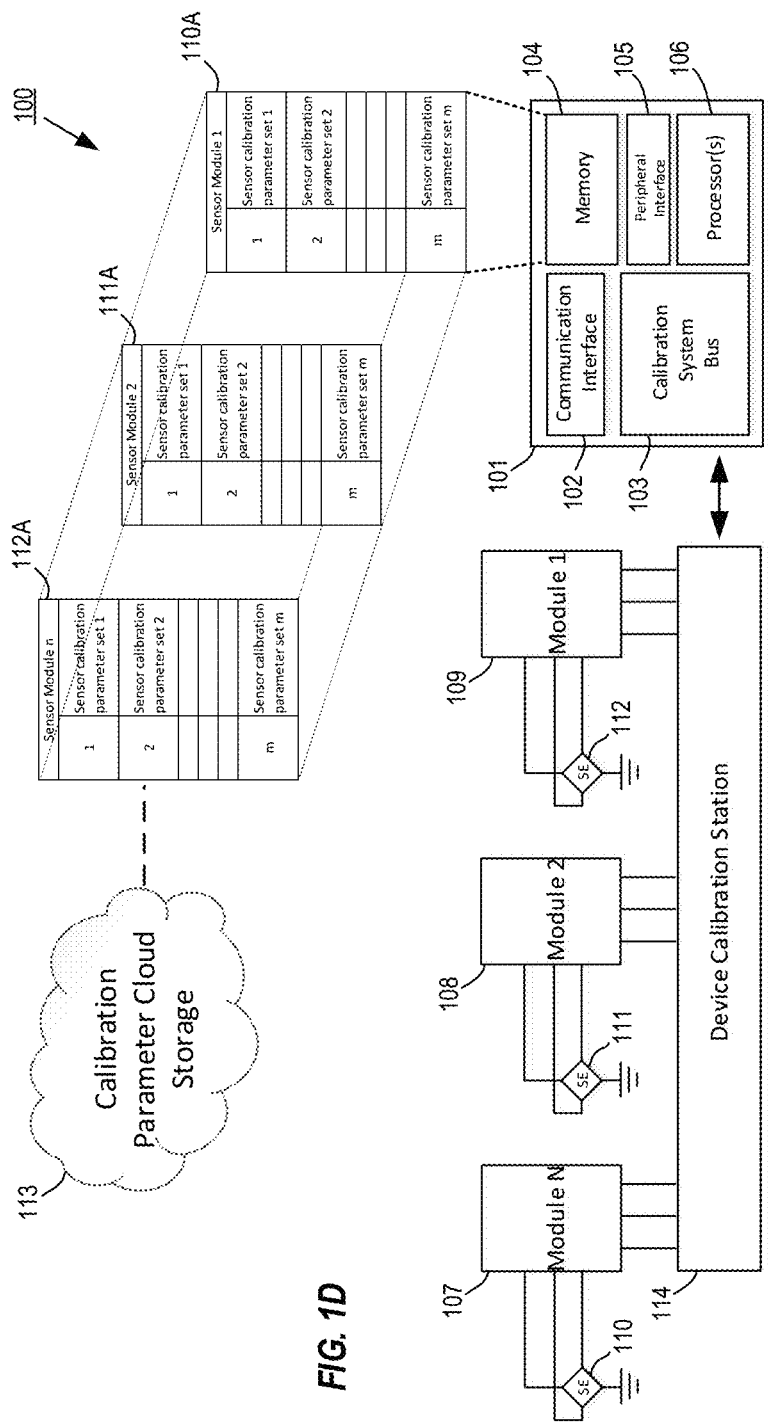
FIG. 1D shows the overall architecture including the computing system and computer network of FIG. 1A, the simplified sensor arrangement of FIG. 1B, and the sensor calibration parameter database of FIG. 1C.

With reference now also to FIG. 1C, a computer network arrangement is shown for sensor system 100 according to an illustrative embodiment. In such an exemplary embodiment, a cloud storage system 113 may be arranged to receive, distribute, update and/or otherwise process and communicate calibration parameters for sensor modules, such as those illustrated in the example of FIG. 1B. It should be understood by those skilled in the art that the term "cloud" as used herein refers to a cloud infrastructure that may be generally defined as a collection of hardware and tangibly-embodied software that enables characteristics of cloud computing. By way of non-limiting examples, illustrative cloud characteristics may include on-demand self-service (e.g., a user may unilaterally provision computing capabilities, such as server time and network storage, as needed automatically without requiring human interaction with each service provider); broad network access (e.g., capabilities are available over the network and accessed through standard mechanisms that promote use by heterogeneous thin or thick client platforms); resource pooling (e.g., the provider's computing resources, such as processing, memory, and network bandwidth, may be pooled to serve multiple users using a multi-tenant model, with different physical and virtual resources dynamically assigned and reassigned according to consumer demand); rapid elasticity (e.g., capabilities can be elastically provisioned and released, in some cases automatically, to scale rapidly outward and inward commensurate with demand); and measured service (e.g., automatically controlling and optimizing resource use by leveraging metering capabilities at some level of abstraction appropriate to the type of service).

In certain illustrative embodiments, cloud infrastructure 113 of sensor system 100 may be viewed as containing a physical layer and an abstraction layer The physical layer may include hardware resources to support the cloud services being provided, and may typically include, server, storage and network components. The abstraction layer may include software deployed across the physical layer, which manifests the cloud characteristics such as those discussed above. Conceptually, the abstraction layer sits above the physical layer. The cloud infrastructure may be deployed as a private cloud (e.g., provisioned for exclusive use by a single organization), a community cloud (e.g., provisioned for exclusive use by a specific community of users from organizations having shared interests), a public cloud (e.g., provisioned for open use by the general public), or a hybrid cloud (e.g., a composition of two or more distinct cloud infrastructures). Of course, these are just a few examples in which calibration parameter storage, processing and distribution for sensor system 100 may be implemented. In certain illustrative embodiments, one or more networked servers (e.g., via the internet) may be utilized for this purpose. In other illustrative embodiments, a private server coupled to computing device 101 may be used. For purposes of brevity only, the individual devices and components of calibration parameter storage 113 are not illustrated in the figures. In an illustrative embodiment, calibration parameter storage 113 also includes security protocols, such as encryption, for providing a secure communication platform. A data analytics engine may also be provided as part of calibration parameter storage 113 in some illustrative embodiments.

As can be seen by way of example in FIG. 1C, calibration parameter storage 113 includes one or more databases 110A, 111A, and 112A, (or 110B, 111B, and 112B in FIG. 4C) relating to individual sensor modules 110-112. In an illustrative embodiment, the one or more databases configured for each sensor module 110-112 may be configured to store a plurality (1-m) of sensor calibration parameters ("sensor calibration parameter set 1-m"), which may be uploaded, modified and transmitted to and from sensor system 100, for example. In certain illustrative embodiments, different calibration parameter settings may be applied to the analog/or and digital implementation circuits of a sensor through the system calibration bus interface 103. A generic sensor calibration cloud based platform may support multiple calibration parameter settings for multiple different types of sensors, as will be apparent to those skilled in the pertinent arts in light of the disclosure herein, wherein each individual sensor device calibration output may be accumulated together with the calibration parameters and stored back into calibration parameter storage 113.

Figure 2:
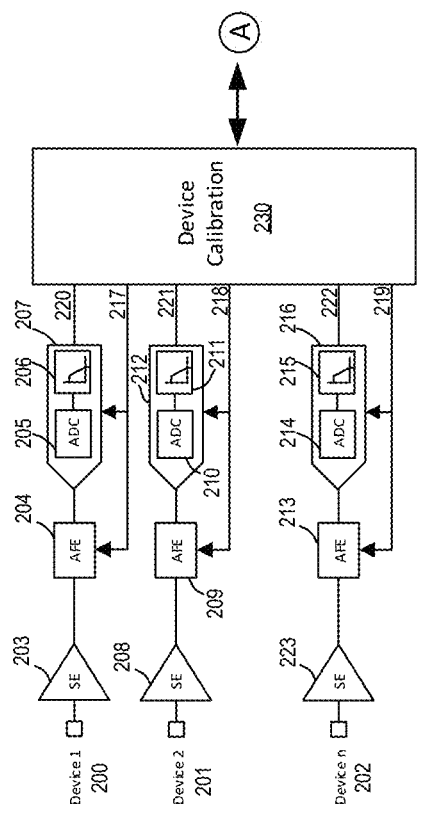
FIG. 2 shows a sensor arrangement having a plurality of sensors that are coupled to the computing device of the sensor system of FIG. 1A via a device calibration module under an illustrative embodiment.

Referring now also to FIG. 2, a sensor arrangement for a generic calibration platform is shown having a plurality of sensors that may be coupled ("A") to the computing device 101 of the sensor system of FIG. 1A via a device calibration station 230, in an illustrative embodiment. The embodiment in FIG. 1B may be configured to represent the embodiment illustrated in FIG. 2, for example. As can be seen in FIG. 2, a plurality of devices 200-202 having respective sensor elements (203, 208, 223) are coupled to a device calibration station 230, which may be configured to load and/or provide (see 217-219) device calibration configuration data to circuitry of each sensor in the sensor arrangement. Device calibration station 230 may also be configured to receive sensor readings (220-222) for transmission to the computing device 101 via a calibration system bus and further to calibration parameter storage 113.

Each of the sensor devices or smart sensor modules of the sensor arrangement of FIG. 2 may include a sensor front-end for signal conditioning, wherein each front end may include an analog front end (AFE) (204, 209, 213), a digital end portion (207, 212, 216) an analog-to-digital converter (ADC) (205, 210, 214), and a digital signal processing (DSP) unit (206, 211, 215). The sensor calibration interface for the sensor arrangement may be configured to couple the AFE block and the digital end to the sensor device calibration station 230. In an illustrative embodiment, the sensor devices or smart sensor modules may be configured in a single channel arrangement for a respective sensor device or smart sensor module calibration, as shown in FIG. 2. In other illustrative embodiments, shared buses/channels may be utilized as well. Such arrangements advantageously allow scalability of multiple sensor devices or smart sensor modules, replicated into scalable multiple channels as illustrated in FIG. 2 (devices 2-n).

Scalable multi-site sensor calibration configurations may be also advantageous when a generic sensor calibration platform is to be replicated and operated in a concurrent fashion. In an illustrative embodiment, the calibration parameter storage 113 may be accessed, in a synchronous, simultaneous, and/or ad-hoc manner, by multiple calibration system computers associated with different calibration platforms (see FIGS. 4A-4B). A generic sensor calibration platform may be configured to cover a wide range of sensor devices or smart sensor modules including, but not limited to, accelerometers, gyroscopes, magnetometers, motion sensors, eCompass, temperature, humidity, environmental, and other specialty sensors as well.

Figure 4A:
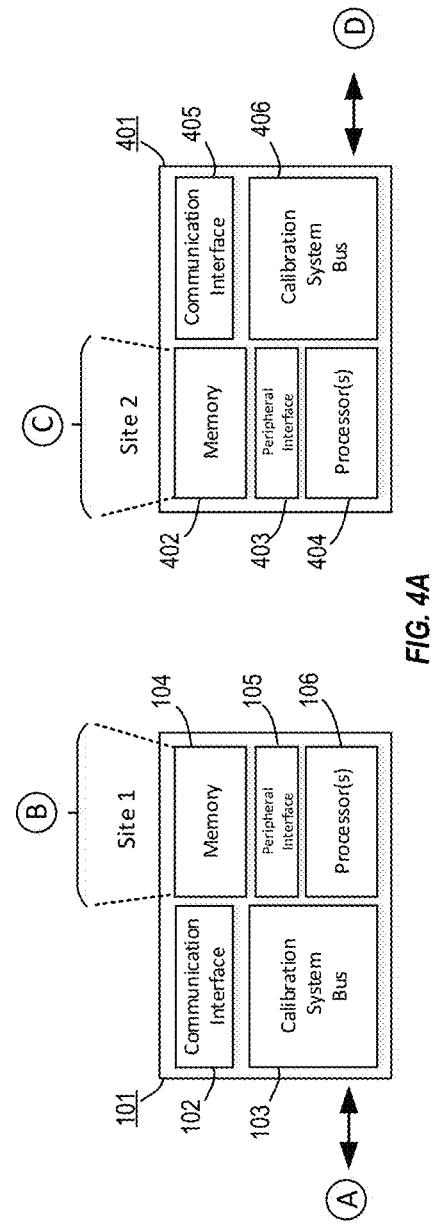
FIG. 4A shows a sensor system including a plurality of computing devices at a plurality of respective sites for facilitating sensor calibration setup/update in a sensor system, wherein each of the computing devices includes a communication interface and a calibration system bus for communicating with respective sensors and/or a computer network under an illustrative embodiment.

In use, parameters from the calibration parameter storage 113 may include sensor calibration coefficients from the parameter settings, and may further include any other suitable coefficients, including, but not limited to, analog programmable gain coefficients settings, analog filter coefficients settings, digital filter coefficients settings, DSP algorithmic implementation coefficients settings, sensor manufacturing process correlated coefficients settings, sensor end user events correlated coefficients settings, sensor device temperature dependent analytic coefficients settings, sensor device voltage dependent analytic coefficients settings, sensor device process dependent analytic coefficients settings, sensor fusion implementation correlated coefficients settings, smart sensor module manufacturing process phase correlated coefficients settings, smart sensor module manufacturing end user events correlated coefficients settings, and so on. As suggested in FIG. 1C, the scalability of the calibration parameter set may be characterized by sensor system 100 as a "sensor calibration parameter set n", where the parameter sets of 1 to n are supported for a scalable implementation in an illustrative embodiment. FIG. 4A also illustrates a corresponding system calibration software operations flow.

It may be appreciated that the calibration parameter storage 113, particularly when configured under a cloud computing platform arrangement, provides a common utility source for maximizing the effectiveness of shared resources. In illustrative embodiments, cloud resources may be shared by multiple users and/or also dynamically reallocated per demand. In accordance with the present disclosure, multiple sensor calibration sites may be provided access to individual test platform configuration parameters, unique sensor device or smart sensor module individualized configurations, along with unique coefficient and parameter settings information and the like, which are dynamically reallocated.

With regard to sensor calibration, one illustrative technique for calibration can be generally described as an activity where the instrument being tested (e.g., sensor) is compared to a known reference value. Without proper calibration, sensor devices may produce data that may be inaccurate, erroneous, and/or misleading. There are many possible sources of error introduced into sensor output data, including those caused by the sensor device circuit or hardware itself. Generally speaking, hardware error can be caused by the sensor hardware implementation at a circuit level, the sensor device component, and/or sensor drift (sensors' characteristics change by age or damage).

Sensor product manufacturing tolerances are typically derived and compensated for by calibrating the sensor produce during a final production manufacturing process, where the calibration data may be utilized when a system is powered up. Environmental parameters for a particular application in the field may also create a need for specialized testing and calibration. Such environmental factors may include circuit component aging, temperature, humidity, and signal level and bias reference, etc. Certain sensor circuits may contain control or average information, which can be periodically stored in memory. These factors may be accounted for using a combination or accumulation of calibration parameters that are stored in the cloud-based calibration parameter storage 113. In some illustrative embodiments, the calibration parameter settings may also include field calibration data. A simple example of field calibration data may include a sensor temperature and compensation adjustment setting. A more complex example of field calibration data may include data reflecting end user application events. For example; a sensor calibrated output (SCO) may be based on a plurality of calibration coefficients $h_0$ $h_1$ $h_2$ $m_0$ $m_1$ $m_2$ $n_0$ $n_1$ $n_2$ that may be expressed as the following for various temperatures and pressures:

$$SCO = (h_0 + h_1 T + h_2 T^2) + (m_0 + m_1 T + m_2 T^2) P + (n_0 + n_1 T + n_2 T^2) P^2 + \ldots$$

Thus, the SCO would be the result of nine total measurements for the calibration, which, expanded for the range of coefficients in the example, essentially requires second order equation computation/processing.

Figure 3:
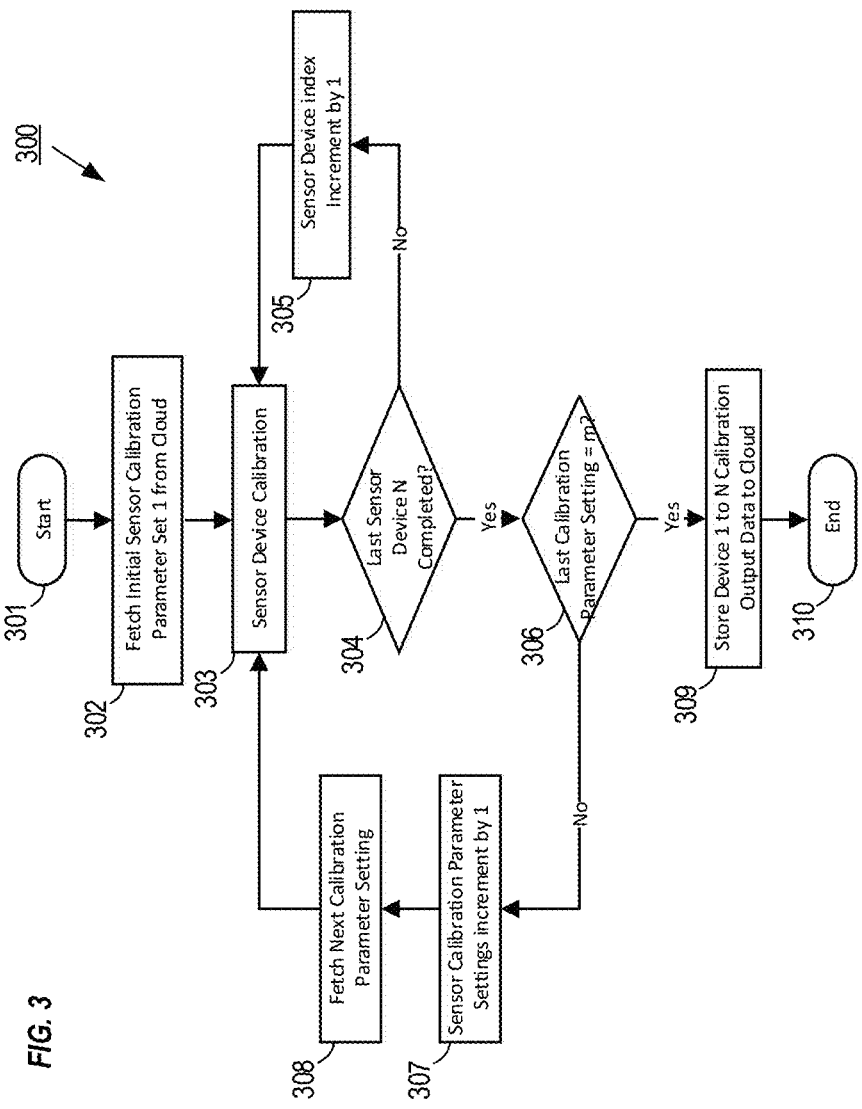
FIG. 3 shows a process for obtaining initial sensor calibration parameters and incrementally calibrating one or more sensors and storing calibration output data to a computer network under an illustrative embodiment.

Turning now also to FIG. 3, an illustrative system calibration process 300 is shown under an illustrative embodiment. After the start 301 of calibration operation 300, a computing device 101 (or other suitable device) fetches a first initial sensor calibration parameter set from the calibration parameter storage 113 in block 302. In block 303, each sensor device is operated using the fetched calibration parameter from block 302, where decision block 304 determines if the last sensor of the device has been operated using the fetched calibration parameter. If not ("NO"), the process of 300 increments the sensor device index in block 305 to move to the next sensor, and the next sensor is subjected to the calibration of block 303. This process may be repeated until the last sensor is calibrated, and decision block 304 determined that the last sensor was calibrated ("YES").

At this point, the process of 300 determines in decision block 306 if the calibration parameter setting used in the calibration of block 303 was the last calibration parameter setting stored and available from calibration parameter storage 113. If further calibration parameter settings are available ("NO"), the process moves to block 307, wherein the sensor calibration parameter setting is incremented by one and the next calibration parameter setting is fetched in block 308. Using the next calibration parameter setting, sensor device calibration is performed in block 303 and again recursively operated through the calibration routines until the last device N is completed ("YES") in block 306. The process 300 then determines again in decision block 306 if the last calibration parameter setting has been used, and, if not, the process 300 proceeds to blocks 307, 308 and 303 to increment the sensor calibration parameter settings by one, fetch the new calibration parameter, and perform sensor device calibration in block 303 as before. The process may repeat until decision block 306 determines that the last calibration parameter setting was used ("YES") at which point all of the device calibration output data is transmitted/stored in calibration parameter storage 113 as shown in block 309. Once stored, the process may end at block 310.

During a system calibration process, a "baseline" may be measured and stored in the calibration system. A baseline may be defined as an initial intrinsic reference point of the system from which the sensor element is initially set. The baseline value for each sensor element may be initialized, maintained and properly stored in calibration parameter storage 113 for subsequent periodic updates. Maintaining the baseline may be important during a sensor calibration operation sequence due to the fact that the system may be impacted by external factors, such as temperature, moisture, humidity, location etc., as well as calibration system setup parameters, such as supply voltage and current. Without maintaining a baseline, such extrinsic factors may cause the sensor element reference baseline measurement results to drift. If this drift occurs during a calibration process and is not taken into account, sensor element measurement errors may exist. As such, calibration adjustment of the baseline for the sensor element measurement setup and adjustment should be performed as part of the sensor calibration process.

For a predefined calibration equation, the various coefficients in the calibration equation may be determined beforehand. In an illustrative embodiment, the AFE gain and offset parameters may be initially determined. In this example, the calibration process may determine two sets of unknown variables: (1) AFE gain and offset values, and (2) calibration equation coefficient values. Sensor front end circuit calibration may be performed as a two-step process, where the first step determines the sensor AFE scaling factors, and the second step determines the digital circuit equation coefficients.

Determining the unknown variables may require appropriate calibration equipment in the production line, which also involves time on the production line. In other words, the calibration of every sense element involves cost. This cost is proportional to the time spent in the calibration process. Accordingly, the calibration process may involve a tradeoff between the number of unknown coefficients, which directly translates to the end-accuracy of the exemplary pressure sensor (as described herein), and the time spent in the calibration process, which translates to cost. In an illustrative embodiment, the calibration may be performed after the sense element is connected to a signal conditioner that may be part of a sensor calibration module.

Sensor AFE circuit calibration may be performed as a multi-step process. In an illustrative embodiment, the gain and the offset calibration parameter in the AFE may be adjusted while the sense element is exposed to certain pressure and temperature conditions. In this example, the sensor sense element (SE) is first exposed to a temperature T1 and pressure P1 that may represent the minimum pressure that the sense element has to measure. The AFE offset calibration parameter may then be adjusted so that the AFE output is as close as possible to the minimum ADC input value. The pressure may then be changed to P2 that may represent the maximum pressure that the sense element has to measure. At the maximum pressure value, the gain may be adjusted so that the AFE output is as close as possible to the maximum ADC input value. For this example, it may be assumed that the offset scales with the sensor AFE gain parameter, which is the case with certain programmable gain amplifier (PGA) gain-setting parameters.

Continuing with the example, once the sensor AFE is calibrated, the sensor digital circuit calibration coefficients may be determined. Determining the actual digital coefficients parameter may be performed as another multi-step process. For example, a sense element may be exposed to different temperature and pressure conditions and the ADC outputs are recorded. The recorded ADC values may then be used to compute digital coefficients offline. The number of temperature and pressure set points, at which the digital representation of temperature and the bridge output are recorded, may depend on the number of coefficients used.

In another illustrative embodiment, a calibration parameter equation may be subject to five coefficients. Using the temperature and the pressure ADC values, they may be recorded at five unique temperature and pressure points. If the desired value at the $N^{th}$ set point is y(n), n=1, 2, 3, 4, 5, then a matrix can be constructed for the calibration sensor output equation as follows:

$$y(1)=h(0)+h(1)T_1+h(2)P_1+h(3)T_1P_1+h(4)P_1^2$$

$$y(2)=h(0)+h(1)T_2+h(2)P_2+h(3)T_2P_2+h(4)P_2^2$$

$$y(3)=h(0)+h(1)T_3+h(2)P_3+h(3)T_3P_3+h(4)P_3^2$$

$$y(4)=h(0)+h(1)T_4+h(2)P_4+h(3)T_4P_4+h(4)P_4^2$$

$$y(5)=h(0)+h(1)T_5+h(2)P_5+h(3)T_5P_5+h(4)P_5^2.$$

Converting the above calibration parameter equation into a matrix produces the following result:

$$\begin{bmatrix} y(1) \\ y(2) \\ y(3) \\ y(4) \\ y(5) \end{bmatrix} = \begin{bmatrix} 1 & T_1 & P_1 & T_1P_1 & P_1^2 \\ 1 & T_2 & P_2 & T_2P_2 & P_2^2 \\ 1 & T_3 & P_3 & T_3P_3 & P_3^2 \\ 1 & T_4 & P_4 & T_4P_4 & P_4^2 \\ 1 & T_5 & P_5 & T_5P_5 & P_5^2 \end{bmatrix} \begin{bmatrix} h(0) \\ h(1) \\ h(2) \\ h(3) \\ h(4) \end{bmatrix}.$$

The sensor calibration coefficients parameter may be computed using a matrix inversion formula given by following equation:

$$\begin{bmatrix} h(0) \\ h(1) \\ h(2) \\ h(3) \\ h(4) \end{bmatrix} = \begin{bmatrix} 1 & T_1 & P_1 & T_1P_1 & P_1^2 \\ 1 & T_2 & P_2 & T_2P_2 & P_2^2 \\ 1 & T_3 & P_3 & T_3P_3 & P_3^2 \\ 1 & T_4 & P_4 & T_4P_4 & P_4^2 \\ 1 & T_5 & P_5 & T_5P_5 & P_5^2 \end{bmatrix}^{-1} \begin{bmatrix} y(1) \\ y(2) \\ y(3) \\ y(4) \\ y(5) \end{bmatrix}.$$

It can be seen that the present disclosure shows a generic sensor calibration platform that may be extended for use by other non-sensor device front end signal conditioning circuit products that encompass similar calibration requirements. It may also be utilized as a manufacturing-centric standard service item for use across multiple sites, and as a technique for optimizing calibration parameter settings in the field.

Figure 4B:
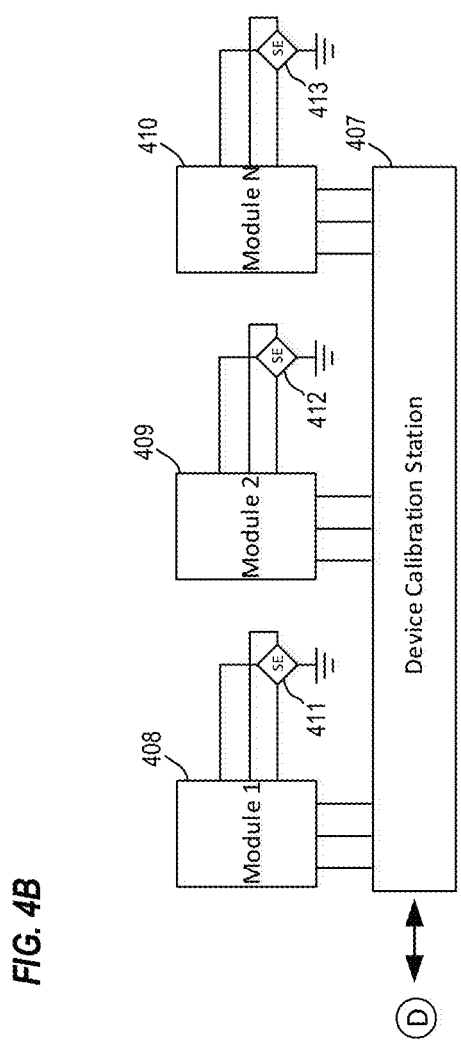
FIG. 4B shows a simplified sensor arrangement having a plurality of sensors that are coupled to the computing device of a second site of the sensor system of FIG. 4A under an illustrative embodiment.

FIGS. 4A and 4B show an illustrative embodiment wherein multiple sites (e.g., "Site 1" and "Site 2") utilize the sensor calibration techniques disclosed herein. Each site may include computing devices 101, 401 communicatively coupled to the computer network of FIG. 1C that includes the plurality of sensor module databases having a plurality of sensor calibration parameter sets. In this example, a first site (Site 1) may include a computing device 101 such as the one disclosed in FIG. 1A and is similarly coupled ("A") to the sensor arrangement of FIG. 1B. A second site (Site 2) may also include a computing device 401 that may be similarly configured to device 101, wherein computing device 401 includes a communication interface 405, a calibration system bus 406, a memory 402, a peripheral interface 403 and one or more processors 404, including, but not limited to, a central processing unit (CPU), co-processor(s), graphics processing unit (GPU), digital signal processor (DSP) and microcontrollers. The communication interface 102 may include any suitable interface (e.g., TCP/IP) allowing communication to/from computer 401 to a computer network ("C") and to sensors ("D") via system bus 103.

Turning to FIG. 4B, a simplified sensor arrangement for Site 2 is shown having a plurality of sensors that are coupled ("D") to the computing device 401 of FIG. 4A under an illustrative embodiment. In this example, the sensor arrangement is configured as one or more sensor devices and/or smart sensor modules arranged for calibration in a manufacturing setup. Each of the sensor devices and/or smart sensor modules may include sensor elements (SE) 411-413 and calibration modules 408-410 arranged as two portions together with device calibration station 407. Those skilled in the art should readily recognize that in certain illustrative embodiments, each SE (411-413) and respective calibration module (409-410) may be integrated together as a single unit. In this example, the sensor arrangement of FIG. 4B may have the same platform as the sensor arrangement of FIG. 1B, but may include different sensors or sensors having different sensor calibration parameter requirements.

Figure 4C:
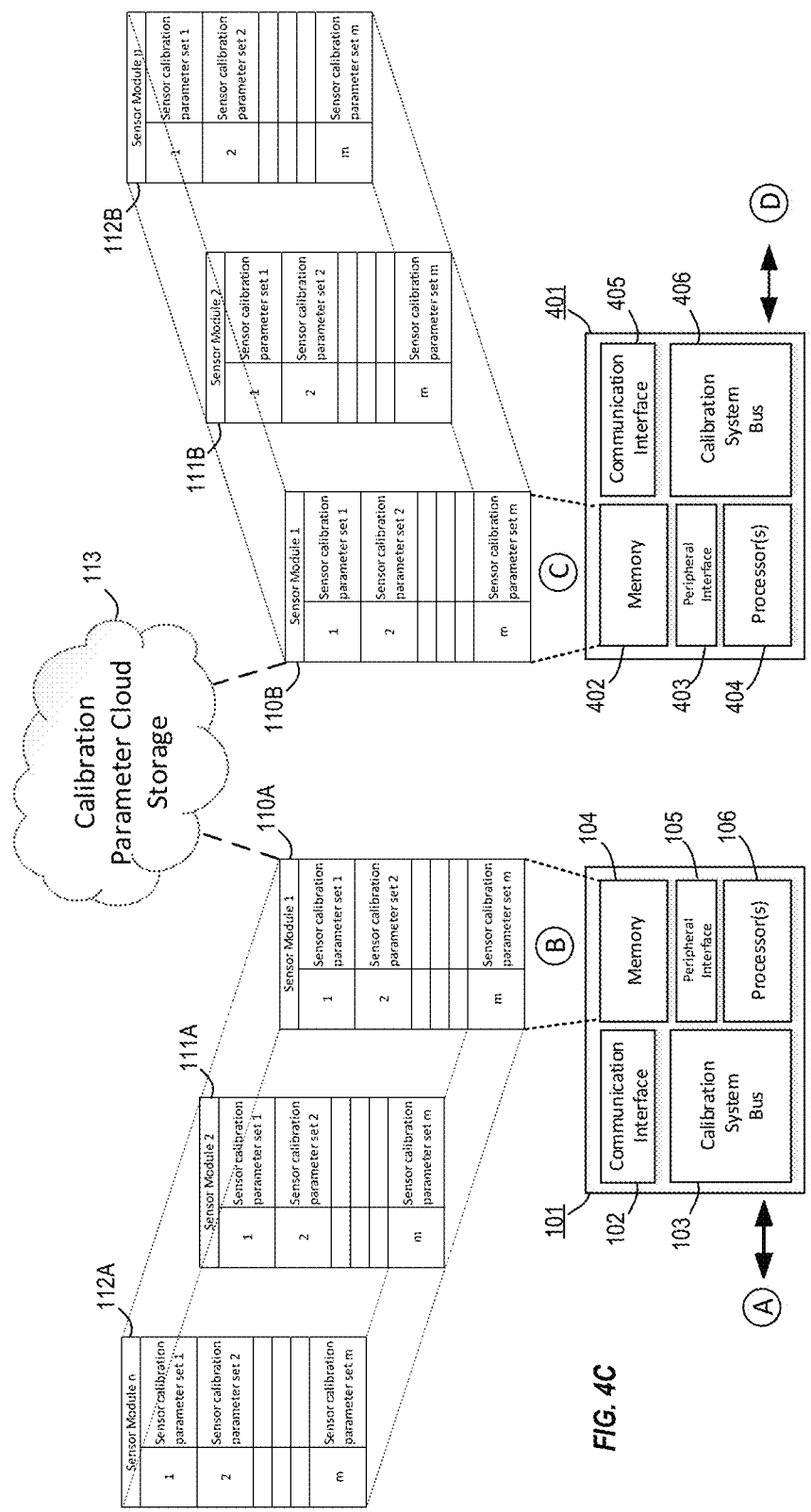
FIG. 4C shows the overall architecture including the multi-site of sensor calibration system implementation of FIG. 4A, the simplified sensor arrangement of FIG. 4B, and the sensor calibration parameter database implementation.

Referring to FIG. 4C, it can be seen that the sensor system may be configured to service both sites individually and/or simultaneously. In this example, sensor calibration parameter sets from database 110A may be communicated ("B") to Site 1 (Device 101), while sensor calibration parameter sets from database 111B may be communicated ("C") to Site 2 (Device 401). Using any of the techniques described herein, each site may recursively calibrate sensor arrangements (e.g., FIG. 1B, FIG. 4B) as described in FIG. 3. Sensor calibration output data may similarly be received from each site (Site 1, Site 2) and stored in a respective database (110A, 111B) as illustrated in FIG. 4C.

It should be appreciated by those skilled in the art that the present disclosure provides effective and efficient sensor device-level calibration for various end user applications events, such that the scalability can be implemented as a manufacturing-centric process as well as a service-oriented product solution. Advantages of the present disclosure may include the system configuration for scalable techniques for implementing a generic service platform for calibrating various sensor front end circuits at the time of manufacturing, such as by fetching current or updated optimized sensor calibration parameters from secure cloud storage. Further advantages may include operating the system in tandem with each individualized sensor updated parameter information that may be accumulated back into the cloud. Additionally, data can be managed through post-manufacturing data analytics programs to analyze, compare, and optimize calibration parameter settings from multiple manufacturing sites, and for updating these same devices once commercially available in the field.

The present disclosure also provides the ability to store large amounts of different calibration parameter settings in secure cloud storage as an extension to conventional non-volatile memory components such as a EEPROM. Through system calibration operations programming sequence managed from a calibration system computer, selected sets of predefined sensor calibration parameters can be fetched from the secure cloud storage and loaded into the calibration system computer's local memory (e.g., during a production phase). For example when a series of device accelerometers are placed on the present generic system platform for sensor calibration setup during production, the predefined accelerometer calibration parameters, which may include calibration coefficients and configuration information, may be fetched from the secure cloud storage and loaded into the calibration system computer's local memory to be managed by the system calibration operations programming sequence.

Where multiple production sites are running concurrent sensor calibration operations, the same or site-specific predefined sensor calibration parameter settings may be fetched from cloud storage and loaded into the manufacturing sensor calibration system computers located at different production sites. The actual system calibration operations programming sequence may manage sensor calibrations for each device in production.

The present disclosure also bridges the gap between individual sensor device level calibration from the component provider (which mainly focuses on sensor device design circuit level intrinsic effects), and the end user sensor calibrations for various applications events. For example, a motion sensor that combines an accelerometer with a gyroscope or magnetometer may be re-calibrated, based on environmental factors or geographic location information. The re-calibrated data may then be fed back to the cloud and subjected to data analytics to become part of new calibration parameter settings. Accordingly, the cloud storage based sensor calibration parameter settings may allow the sensor manufacturing process to program either the initial sensor design-related calibration parameter settings at the circuit level, or use modified settings based on analytics outputs that integrate end-user application-related criteria to provide optimized settings for various user applications events. In addition, different manufacturing process-related variations (e.g., long time drift effects, recent sensor manufacturer enhancements) may also be accounted for as part of the cloud based calibration parameter settings.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A computer system for calibrating both in-field and in-manufacture sensors, comprising:
   a processor;
   a communication interface operatively coupled to the processor, the communication interface having a plurality of calibrations modules each configured to receive a calibration parameter set from a remote cloud-based application via a computer network, wherein the remote cloud-based application assesses at least a use application and environmental factors prior to providing each of the calibration parameter sets;
   a plurality of calibration system buses operatively coupled to the processor, wherein each of the calibration system buses transmits the received calibration parameter set for a particular one of the plurality of calibration modules to the respective ones of the sensors,
   wherein each of the calibration system buses receives calibration output data from the in-field ones of the respective sensors in response to the calibration parameter being set using the transmitted parameter set, and wherein the communications interface transmits the calibration output data to the remote cloud-based application over the computer network, thereby generating a new calibration parameter set received by the communication interface from the remote cloud-based application.

2. The computer system of claim 1, wherein the calibration output data from the sensors comprises analog front end gain data and offset value data.

3. The computer system of claim 2, wherein the calibration data output data comprises calibration coefficient value data.

4. The computer system of claim 3, wherein the calibration coefficient value data comprises at least one of analog programmable gain coefficients settings, analog filter coefficients settings, digital filter coefficients settings, digital signal processor (DSP) algorithmic implementation coefficients settings, sensor manufacturing process correlated coefficients settings, sensor end user events correlated coefficients settings, sensor device temperature dependent analytic coefficients settings, sensor device voltage dependent analytic coefficients settings, sensor device process dependent analytic coefficients settings, sensor fusion implementation correlated coefficients settings, sensor module manufacturing process phase correlated coefficients settings, and sensor module manufacturing end user events correlated coefficients settings.

5. The computer system of claim 1, wherein the calibration output data comprises sensor operation based on at least one of a minimum and maximum sensing value based on the calibration parameter set.

6. The computer system of claim 1, wherein the calibration output data comprises sensor operation based on a plurality of predetermined sensing values, based on the calibration parameter set.

7. A method for calibrating both in-field and in-manufacture sensors, comprising:
   receiving a calibration parameter set for one type of the in-manufacture sensors from a remote cloud-based application over a computer network, wherein the calibration parameter set is dependent upon at least a use application and environmental factors prior to providing the calibration parameter set;
   providing the received calibration parameter set to each of the in-field sensors using one of a plurality of dedicated calibration system buses, each of which is dedicated to the one type of the in-manufacture sensors;
   generating calibration output data from the in-field sensors in response to the calibration parameter set;
   transmitting the calibration output data to the computer network for receipt over the dedicated bus; and
   receiving a new calibration parameter set for the in-manufacture sensors in response to the calibration output data.

8. The method of claim 7, wherein the calibration output data from the sensors comprises analog front end gain data and offset value data.

9. The method of claim 8, wherein the calibration data output data comprises calibration coefficient value data.

10. The method of claim 9, wherein the calibration coefficient value data comprises at least one of analog programmable gain coefficients settings, analog filter coefficients settings, digital filter coefficients settings, digital signal processor (DSP) algorithmic implementation coefficients settings, sensor manufacturing process correlated coefficients settings, sensor end user events correlated coefficients settings, sensor device temperature dependent analytic coefficients settings, sensor device voltage dependent analytic coefficients settings, sensor device process dependent analytic coefficients settings, sensor fusion implementation correlated coefficients settings, sensor module manufacturing process phase correlated coefficients settings, and sensor module manufacturing end user events correlated coefficients settings.

11. The method of claim 7, wherein the calibration output data comprises sensor operation based on at least one of a minimum and maximum sensing value based on the calibration parameter set.

12. The method of claim 7, wherein the calibration output data comprises sensor operation based on a plurality of predetermined sensing values, based on the calibration parameter set.

* * * * *